(12) United States Patent
Cheung et al.

(10) Patent No.: US 9,159,321 B2
(45) Date of Patent: Oct. 13, 2015

(54) LIP-PASSWORD BASED SPEAKER VERIFICATION SYSTEM

(71) Applicant: Hong Kong Baptist University, Hong Kong (HK)

(72) Inventors: Yiu-ming Cheung, Hong Kong (HK); Xin Liu, Hong Kong (HK)

(73) Assignee: HONG KONG BAPTIST UNIVERSITY, Kowloon Tong, Kowloon (HK)

( * ) Notice: Subject to any disclaimer, the term of this patent is extended or adjusted under 35 U.S.C. 154(b) by 198 days.

(21) Appl. No.: 13/776,615

(22) Filed: Feb. 25, 2013

(65) Prior Publication Data
US 2013/0226587 A1    Aug. 29, 2013

Related U.S. Application Data

(60) Provisional application No. 61/603,388, filed on Feb. 27, 2012.

(51) Int. Cl.
*G10L 15/25* (2013.01)
*G06K 9/00* (2006.01)

(52) U.S. Cl.
CPC ............ *G10L 15/25* (2013.01); *G06K 9/00335* (2013.01)

(58) Field of Classification Search
CPC ...................................................... G10L 15/25
USPC ......................................... 704/273; 382/118
See application file for complete search history.

(56) References Cited

U.S. PATENT DOCUMENTS

| 6,219,639 | B1 | 4/2001 | Bakis et al. |
| 6,421,453 | B1 | 7/2002 | Kanevsky et al. |
| 7,962,342 | B1 * | 6/2011 | Coughlan et al. ........... 704/270.1 |
| 2002/0126879 | A1 * | 9/2002 | Mihara et al. .................. 382/118 |
| 2011/0235870 | A1 | 9/2011 | Ichikawa et al. |
| 2013/0226587 | A1 | 8/2013 | Cheung et al. |

OTHER PUBLICATIONS

A. W. C. Liew et al., "Lip contour extraction from color images using a deformable model," Pattern Recognition, vol. 35, No. 12, pp. 2949-2962, 2002.
D. Tao et al., "Asymmetric bagging and random subspace for support vector machines-based relevance feedback in image retrieval," IEEE Transactions on Pattern Analysis and Machine Intelligence, vol. 28, pp. 1088-1099, 2006.
F. Gustafsson, "Determining the initial states in forward-backward filtering," IEEE Transactions on Signal Processing, vol. 44, No. 4, pp. 988-992, 1996.

(Continued)

*Primary Examiner* — Qian Yang
(74) *Attorney, Agent, or Firm* — Sam T. Yip

(57) ABSTRACT

A lip-based speaker verification system for identifying a speaker using a modality of lip motions; wherein an identification key of the speaker comprising one or more passwords; wherein the one or more passwords are embedded into lip motions of the speaker; wherein the speaker is verified by underlying dynamic characteristics of the lip motions; and wherein the speaker is required to match the one or more passwords embedded in the lip motions with registered information in a database. That is, in the case where the target speaker saying the wrong password or even in the case where an impostor knowing and saying the correct password, the nonconformities will be detected and the authentications/accesses will be denied.

11 Claims, 9 Drawing Sheets

(56) References Cited

OTHER PUBLICATIONS

H. E. Cetingul et al., "Discriminative analysis of lip motion features for speaker identification and speech-reading," IEEE Transactions on Image Processing, vol. 15, No. 10, pp. 2879-2891, 2006.

L. I. Kuncheva et al., "Measures of diversity in classifier ensembles and their relationship with the 10 ensemble accuracy," Machine Learning, vol. 51, No. 2, pp. 181-207, 2003.

L. L. Mok et al, "Lip features selection with application to person authentication," in Proc. IEEE International Confeence on Acoustics, Speech, and Signal Processing, vol. 3, 2004, pp. iii-397-400 vol. 3.

M. N. Kaynak et al., "Analysis of lip geometric features for audio-visual speech recognition," IEEE Transactions on Systems, Man, and Cybernetics Part A: Systems and Humans, vol. 34, No. 4, pp. 564-570, 2004.

M. N. Siu et al., "Discriminatively trained gmms for language classification using boosting methods," IEEE Transactions on Audio, Speech and Language Processing, vol. 17, No. 1, pp. 5 187-197, 2009.

M. H. Mak et al., "Lip-motion analysis for speech segmentation in noise," Speech Communication, vol. 14, No. 3, pp. 279-296, 1994.

S. L. Wang et al., "Automatic lip contour extraction from color images," Pattern Recognition, vol. 37, No. 12, pp. 10 2375-2387, 2004.

S. W. Foo et al., "Recognition of visual speech elements using adaptively boosted hidden markov models," IEEE Transactions on Circuits and Systems for Video Technology, vol. 14, No. 5, pp. 693-10 705, 2004.

T. K. Ho, "The random subspace method for constructing decision forests," IEEE Transactions on Pattern Analysis and Machine Intelligence, vol. 20, No. 8, pp. 832-844, 1998.

T. Wark et al., "An approach to statistical lip modelling for speaker identification via chromatic feature extraction," in Proc. 15 IEEE International Conference on Pattern Recognition, vol. 1, 1998, pp. 123-125 vol. 1.

W. C. Yau et al., "Visual speech recognition and utterance segmentation based on mouth movement," Digital Image Computing Techniques and Applications, vol. 0, pp. 7-14, 2007.

X. Liu et al., "A robust lip tracking algorithm using localized color active contours and deformable models," in Proc. IEEE International Conference on Acoustics, Speech, and Signal Processing, 2011, pp. 1197-1200.

X. Wang et al., "Boosted multi-task learning for 15 face verification with applications to web image and video search," in Proc. IEEE International Conference on Computer Vision and Pattern Recognition, 2009, pp. 142-149.

* cited by examiner

LIP-PASSWORD BASED SPEAKER VERIFICATION SYSTEM

CROSS-REFERENCE TO RELATED APPLICATIONS

The present application claims priority of U.S. provisional application No. 61/603,388 filed on Feb. 27, 2012, and which the disclosures are hereby incorporated by reference by its entirety.

FIELD OF INVENTION

The present invention relates to method and apparatus of a multi-boosted Hidden Markov Model (HMM) learning approach to lip motion password (simply called lip-password hereinafter) based speaker verification system. In particular, the present invention relates to method and apparatus of a double security speaker verification system, where the authenticating speaker is verified by both of the lip-password and the underlying behavior characteristics of lip motions simultaneously. That is, in the case where the target speaker saying the wrong password or even in the case where an impostor knowing and saying the correct password, the non-conformities will be detected and the authentications/accesses will be denied.

BACKGROUND OF INVENTION

Speaker verification has received considerable attention in the community because of its attractable applications in financial transaction authentication, secure access, security protection, human-computer interfaces and other real-world applications. It aims at verifying a authenticating speaker's identity using pre-stored information within an access-controlled system and the speaker will be either accepted as a target speaker or rejected as an impostor under a certain matching criterion.

In general, speech not only conveys the linguistic information but also characterizes the speaker's identity, which can thus be utilized for speaker verification. Traditionally, the acoustic speech signals may be the most natural modality to achieve speaker verification. Although a purely acoustic-based speaker verification system is effective in its application domain, its performance would be degraded dramatically in the environment corrupted by the background noise or multiple talkers. Under the circumstances, as shown in FIG. 1, speaker verification system by taking into account some video information such as the still frames of face and temporal lip motions, has shown an improved performance over acoustic-only systems. Nevertheless, the access-controlled systems utilizing the still face images are very susceptible to the poor picture qualities, variations in pose or facial expressions, and are easily deceived by a face photograph placed in front of the camera as well. In recent years, speaker verification utilizing or fused with lip motions has received wide attention in the community. As a kind of behavior characteristics, the lip motions accompanying with the lip shape variations, tongue and teeth visibility, always contain rich and sufficient information to characterize the identity of a speaker. Nevertheless, the performances of the existing lip motion based speaker verification systems are far behind our expectation. The main reasons are two-fold: (1) The principal components of features representing each lip frame are not always sufficient to distinguish the biometric properties between different speakers; (2) The traditional lip motion modeling approaches, e.g. single Gaussian Mixture Model (GMM), single Hidden Markov Model (HMM), are not capable of providing the optimal model descriptions to verify some hard-to-classify speakers. For instance, some lip motions between different speakers are so similar that the corresponding models learned from these conventional approaches are not so discriminative enough to differentiate these speakers. In strengthening the security capacity of speaker verification systems, some researchers attempted to adopt multi-modal expert fusion system by combining audio, lip motion sequence and face information to improve the robustness and overall verification performance. Nevertheless, the appropriate fusion between different modalities is extremely difficult meanwhile it may not be easy to carry out multi-modal experts synchronously in real-world applications.

From a practical viewpoint, the password protected biometric based speaker verification system will hold a double security to the system, where a speaker is not only verified by his or her natural biometric characteristics, but also required to match a specific password. Unfortunately, the acoustic signals with private password information are easily perceived and intercepted by the listeners nearby, while the still face images could not be embedded with a secure password phrase directly. In contrast, the lip motion password (simply called lip-password hereinafter) protected speaker verification system is able to hold the double security to the system. That is, the speaker will be verified by both of the lip-password and underlying behavior characteristics of lip motions simultaneously. In addition, such a system has at least four merits as follows: (1) The modality of lip motion is completely insensitive to the background noise; (2) The acquisition of lip motions is somewhat insusceptible to the distance; (3) Such a system can be used by a mute person; (4) Lip-password protected speaker verification system has its unique superiorities of silence and hidden property. Therefore, the development of an effective and efficient approach to realizing the lip-password based speaker verification becomes quite desirable.

FIG. 2 is a block/flow diagram illustrating apparatus/procedure for speaker registration phase within the lip-password based speaker verification system. An authorized speaker/user may, for example, silently utters his/her private password by facing a video camera connected to a computer processing system. Then, the video camera and computer processing system capture, process and analyze the recorded video sequence to obtain the desired lip-password sequence. According to the selected password style (separate: the lip-password can be segmented into several visibly distinguishable units of visual speech elements; non-separate: the lip-password cannot be easily divided into several visual speech elements), the system shall model/code the password sequence automatically such that a registered lip-password database can be established.

FIG. 3 is a block/flow diagram illustrating apparatus/procedure for speaker verification phase within the lip-password based speaker verification system. By facing a video camera connected to a computer processing system, an unknown speaker/user attempts to obtain an access by uttering a password sequence. Then, the video camera and computer processing system capture, process, and analyze the recorded video sequence (e.g., lip region localization, feature extraction, lip motion segmentation) to extract the interested lip-password sequence. According to the pre-registered lip-password sequence, the system shall make a decision based on the matching calculation result, i.e., lip motion matching and password information matching.

In previous applications of lip motion based speaker verification systems, e.g., T Wark, S. Sridharan, and V Chandran, "*An approach to statistical lip modelling for speaker identification via chromatic feature extraction,*" in *Proc. IEEE International Conference on Pattern Recognition*, vol 1, 1998, pp. 123-125 vol. 1 and L. L. Mok, W H. Lau, S. H. Leung, S. L. Wang, and H. Yan, "*Lip features selection with application to person authentication,*" in *Proc. IEEE International Conference on Acoustics, Speech, and Signal Processing*, vol 3, 2004, pp. iii-397-400 vol. 3, the authors generally proposed to take the whole utterance as the basic processing unit. Although different speakers may have different lip motion activities, some of these motions are so similar that it is very difficult to match them based on the global modeling methods, e.g., single GMM, and single HMM. These types of approach are usually designed to support a small vocabulary of utterances such as isolated words, digits and letters, but which may not be suitable to cover a little bit long utterance (e.g., a password). The main reason lies in that a large number of sample sequences have to be collected to train all possible models that may appear in the long speech. Furthermore, the design for lip-password protected system should be capable of detecting the target speaker saying the wrong password. Unfortunately, such a method of taking the whole utterance as the basic processing units is incompetent for this task. In fact, the lip-password utterance generally comprises of multiple subunits (i.e., the smallest visibly distinguishable unit of visual speech elements). These subunits indicate a short period of lip motions and always have diverse styles between different elements. Hence, to investigate more detailed lip motion characteristics, these subunits should be considered individually instead of being taking jointly (i.e., whole utterance).

In this document, we mainly focus on digital lip-password based speaker verification problem, i.e. the password composed of the digits from 0 to 9 only, although the underlying concept and the techniques are also applicable to non-digit lip-password as well. To this end, we firstly extract a group of representative visual features to characterize each lip frame, and then propose a simple but effective algorithm to segment the digital lip-password sequence into a small set of distinguishable subunits. Subsequently, we integrate HMMs with boosting learning framework associated with random subspace method (RSM) and data sharing scheme (DSS) to model the segmental sequence of the input subunit discriminatively so that a precise decision boundary is formulated for these subunits verification. Finally, the digital lip-password whether spoken by the target speaker with the pre-registered password or not is determined via all verification results of the subunits learned from multi-boosted HMMs. Experimental results have shown its efficacy.

Overview of Related Works

During the past decade, a few techniques such as neural Network (NN), GMM and HMM have been developed for lip motion based applications. In general, the successful achievement of lip motion based speaker verification lies in a closer investigation of the physical process of the corresponding lip motion activities, which always contain strong temporal correlations between the adjacent observed frames. Hence, among these methods, the HMM has been the most popular methodologies because its underlying state structure can successfully model the temporal variations in lip motion activities. The following paragraphs shall firstly review discrimination analysis in HMM-based speaker verification, and then overview the framework of HMM-based speaker verification and Adaboost learning.

Discrimination Analysis

To the best of our knowledge, the performance of the existing HMM-based speaker verification systems using lip motions is still far behind our expectations. The plausible reasons are two-fold: (1) The visual features extracted from the lip movements are not so discriminative enough for lip motion modeling and subsequent similarity measurement; (2) The learned lip motion models are not sufficient to well characterize the corresponding motion characteristics. For robust speaker verification, discriminative learning is still desired, which can be roughly made along two lines: discriminative feature selection and discriminative model learning.

Discriminative feature selection methods aiming at minimizing the classification loss will not only emphasize the informative features but also filter out the irrelevant features. Ertan et al. in H. E. Cetingul, Y. Yemez, E. Engin, and A. M. Tekalp, "*Discriminative analysis of lip motion features for speaker identification and speech-reading,*" IEEE Transactions on Image Processing, vol 15, no. 10, pp. 2879-2891, 2006 adopted the strategy that the joint discrimination measure of any two features is less than the sum of their individual discrimination powers. Accordingly, they utilized the Bayesian technique to select the representative features of each frame discriminatively provided that the feature components are statistically independent. However, it is very difficult, if not impossible, to determine which single feature component has more discrimination power. Often, the feature components belonging to the same feature category are not statistically independent each other.

Discriminative model learning approaches featuring on parameter optimizations always achieve a better performance over non-discriminative learning approaches. In HMM, its parameters are normally estimated by Maximum Likelihood Estimation (MLE). Recently, some researchers have shown that the decision boundary obtained via discriminative parameters learning algorithms is usually superior than the decision boundary obtained from MLE. Typical methods include Maximum Mutual Information (MMI), conditional maximum likelihood (CML) and minimum classification error (MCE). These methods aiming at maximizing the conditional likelihood or minimizing the classification error usually achieved a better performance than MLE approach. Nevertheless, these methods cannot be implemented straightforwardly and are utilized for certain special tasks only.

However, the majority of the existing HMM-based speaker verification systems just adopt a fixed scheme of utilizing a single HMM for lip motion modeling and similarity measurement, which may not generate a good performance due to its limited discrimination power. Most recently, some multiple classifiers based systems trained on different data subsets or feature subsets have yielded a better result compared to a single classifier system. These classifier ensemble approaches are capable of generating more discrimination power to obtain the better classification result.

Among the existing ensemble algorithms, Adaboost is the most popular and effective learning methods. Different from the other traditional ensemble methods such as sum rule and majority vote, Adaboost aims at building a strong classifier by sequentially training and combining a group of weak classifiers in such a way that the later classifiers would focus more and more on hard-to-classify examples. Consequently, the mistakes made by the ensemble classifiers are reduced. Recently, some sequence modeling and classification methods, e.g., GMM, HMM, were successful in integrating with boosting learning framework to form a strong discriminative sequence learning approaches. Siu et aL in M. H. Siu, X.

Yang, and H. Gish, "*Discriminatively trained gmms for language classification using boosting methods,*" *IEEE Transactions on Audio, Speech and Language Processing*, vol 17, no. 1, pp. 187-197, 2009 have utilized boosting method to discriminatively train GMMs for language classification. Foo et al. in S. W Foo, Y Lian, and L. Dong, "*Recognition of visual speech elements using adaptively boosted hidden markov models,*" *IEEE Transactions on Circuits and Systems for Video Technology*, vol 14, no. 5, pp. 693-705, 2004 have employed adaptively boosted HMMs to achieve visual speech elements recognition. From their experimental results, it can be found that traditional single modeling and classification methods fail to identify some samples with less discrimination capability while the boosted modeling and classification approaches hold the promise of identifying these hard-to-classify examples. Inspired by these findings, we shall integrate HMMs with the boosting learning framework to verify some hard-to-classify lip-passwords accordingly.

Overview of HMM-based Speaker Verification

Let the video databases comprise a group of lip motions generated from both of the target speaker and imposters. Each lip motion contains a series of lip frame sequences. For the HMM of the $e^{th}$ lip motion, its model $\lambda_e=(\pi_e, A_e, B_e)$, is built with N hidden states, denoted by $S^e=\{S_1^e, S_2^e, \ldots, S_N^e\}$. Suppose $\lambda_e$ is trained from the observed lip sequence $O_e=\{o_1^e, o_2^e, \ldots, o_{l_e}^e\}$ and emitted from a sequence of hidden states $s^e=\{s_1^e, s_2^e, \ldots s_{l_e}^e\}$, $s_t^e \in S^e=\{S_1^e, S_2^e, \ldots, S_N^e\}$, where $l_e$ is the total number of frames. Let the output of an HMM take M discrete values from a finite symbol set $V^e=\{v_1^e, v_2^e, \ldots, v_M^e\}$. For an N-state-M-symbol HMM, the parameter details of the model $\lambda_e$ are summarized as follows:

1. The initial distribution of the hidden states $\pi_e=[\pi_i]_{1 \times N}=[P(s_1^e=S_i^e)]_{1 \times N}$ ($1 \le i \le N$), where $s_1^e$ is the first observed state in the state chain.
2. The state transition matrix $A_e=[a_{i,j}]_{N \times N}=[P(s_{t+1}^e=S_j^e|s_t^e=S_i^e)]_{N \times N}$ ($1 \le i, j \le N$, $1 \le t \le l_e$), where $s_{t+1}^e$ and $s_t^e$ represent the states at the $(t+1)^{th}$ and $t^{th}$ frame, respectively.
3. The symbol emission matrix $B_e=[b_j(k)]_{N \times M}=[P(v_k^e$ at $t|s_t^e=S_j^e)]_{N \times M}$ ($1 \le j \le N$, $1 \le k \le M$). It indicates the probability distribution of a symbol output $v_k^e$ conditioned on the state $S_j^e$ at the $t^{th}$ frame.

In general, a typical estimate of $\lambda_e$ can be iteratively computed using Baum-Welch algorithm. The model obtained via this type of approach can better describe the dynamics of the input sequence. Meanwhile, such a method has the advantages of easy implementation and fast speedy convergence. Given the test observation sequence $O_s=\{o_1^s, o_2^s, \ldots o_{l_s}^s\}$, the goal of the speaker verification task is to find a decision in terms of computing the likelihood between the test sequence with the target speaker model $\lambda(T)$ and imposter model $\lambda(I)$. By adopting conditional independence assumptions between the observed variables, the likelihood of observation sequence conditioned on the specified model is computed as follows:

$$P(O_s|\lambda_i) = \prod_{t=1}^{l_s} P(o_t^s|\lambda_i), \lambda_i \in \{\lambda(T), \lambda(I)\}. \quad (1)$$

The likelihood score $P(o_t^s|\lambda_i)$ can be measured by means of forward-backward algorithm while its most probable path can be obtained via Viterbi decoding algorithm [27].

In general, the modality for HMM-based speaker verification can be regarded as a binary classification between the target speaker and impostor, which can be extensionally grouped into closed-set and open-set learning problem. In the closed-set case, the testing utterances of the speakers are recorded to be known, and the models of both the target-speaker and imposter can be learned during the training phase. Given a test observation sequence: $O_s=\{o_1^s, o_2^s, o_{l_s}^s\}$, the classification for this type of speaker verification problem is performed based on the log likelihood ratio (LLR):

$$\begin{aligned}LLR(O_s) &= \log\frac{P(O_s|\lambda(T))}{P(O_s|\lambda(I))} \\ &= \log\frac{\prod_{t=1}^{l_s} P(o_t^s|\lambda(T))}{\prod_{t=1}^{l_s} P(o_t^s|\lambda(I))} \\ &= \sum_{t=1}^{l_s} [\log P(o_t^s|\lambda(T)) - \log P(o_t^s|\lambda(I))]\end{aligned} \quad (2)$$

if $LLR(O_s) \ge \tau$: accepted.

Otherwise: rejected.

In the open-set case, the imposters are recorded to be unknown. Hence, the imposter models could not be trained due to their arbitrariness. Given the observations that are recoded from unknown speakers, the task is to find whether it belongs to the target speaker registered in the database or not. Note that, in digital lip-password scenario, the utterance styles differing from the registered one are considered to be imposters even they come from the same speaker. Further, the frame length of the utterance may slightly change. Thereupon, this kind of verification problem is conducted based on normalized log likelihood (NLL):

$$\begin{aligned}NLL(O_s) &= \frac{1}{l_s} \log P(O_s|\lambda(T)) \\ &= \frac{1}{l_s} \sum_{t=1}^{l_s} \log P(o_t^s|\lambda(T)).\end{aligned} \quad (3)$$

if $NLL(O_s) \ge \tau$: accepted.

Otherwise: rejected.

Overview of Adaboost Learning

Let us consider a two-class classification problem. Given a set of $N_t$ labeled training samples $(x_1, y_1), (x_2, y_2), \ldots, (x_{N_t}, y_{N_t})$, where $y_i \in \{1, -1\}$ is the class label for the sample $x_i \in \mathbb{R}^n$. Each training sample has a weight $w_i$ (distribution), which is assigned to get the uniform value initially. Let $h(x)$ denote a decision stump (weaker classifier), which generates $\pm 1$ labels. The procedure of AdaBoost involves a series of boosting rounds R of weaker classifier learning and weight adjusting under a loss minimization framework, featuring on producing a decision rule as follows:

$$H_R(x) = \sum_{m=1}^{R} \alpha_m h_m(x), \quad (4)$$

where $\alpha_m$ represents the vote (i.e. confidence) of the decision stump $h_m$. In general, the optimal value of $a_m$ is accomplished via minimizing an exponential loss function [23]:

$$\text{Loss}(H_R(x)) = \sum_{i=1}^{N_t} \exp(-y_i H_R(x_i)). \qquad (5)$$

Given the current ensemble classifier $H_{r-1}(x)$ and newly learned weak classifier $h_r(x)$ at r boosting round, the optimal coefficient $\alpha_r$ for the ensemble classifier $H(x)=H_{r-1}(x)+\alpha_r h_r(x)$ is the one which can lead to the minimum cost:

$$\alpha_r = \underset{a}{\arg\min}(\text{Loss}(H_{r-1}(x) + \alpha h_r(x))). \qquad (6)$$

According to the optimization algorithm [28], let $\epsilon^r$ be the weighted training classification error, i.e., $$\varepsilon^r = \sum_{i=1}^{N_t} w_i^r \cdot [h_r(x_i) \neq y_i]. \qquad (7)$$

The resultant $\alpha_r$ and updated $w_i$ are formulated as:

$$\alpha_r = \frac{1}{2} \log\left(\frac{1-\varepsilon^r}{\varepsilon^r}\right) \qquad (8)$$

$$w_i^{r+1} = w_i^r \cdot \exp(-y_i \alpha_r h_r(x_i)). \qquad (9)$$

Following this framework as depicted in FIG. 4, the weight for hard-to-classify examples is increased. Meanwhile, the updated weights also determine the probability of the examples being selected to form a novel training data set for subsequent component classifier. For instance, if a training sample is classified accurately, its chance of being selected again for the subsequent component classifier is reduced. Conversely, if the sample is not accurately classified, then its chance of being selected again is raised. By calling the component classifier several times (i.e., boosting rounds), as long as the training error of the component classifier is less than 0.5, the training error of the ensemble classifier will also decrease as the boosting round continues. In Adaboost, the individual classifiers are built in parallel and independent each other. Consequently, it will generate a strong classifier by linearly combining these component classifiers weighted by their votes through a sequence of optimization iterations.

In the prior arts, such as the U.S. Pat. No. 6,219,639, the United States Patent Application Publication No. 2011/0235870 and the U.S. Pat. No. 6,421,453, it is disclosed that lip information is incorporated to enhance access security. Nonetheless, these prior arts invariably require incorporating at least one other biometric modalities such as face, acoustical signals, voice-print, signature, fingerprint and retinal print, to achieve speaker verification, and often require more complicated procedures to achieve the security goals. To the best of our current knowledge, there is no known prior art that is based on one modality of lip motions but also at the same time embeds the private password information as a double security to the access-controlled system, where the speaker is not only verified by his or her underlying dynamic characteristics of lip motions, but also required to match a specific password embedded in the lip motion simultaneously.

The objective of the present invention is to provide a method and apparatus for a lip-password based speaker verification approach that merely utilizes one modality of lip motions, in which the private password information is embedded into the lip motions synchronously. A further objective of the present invention is to provide a method and apparatus that guarantees that it maintains a double security to an access-controlled system, where the speaker is not only verified by his or her underlying dynamic characteristics of lip motions, but also required to match a specific password embedded in the lip motion simultaneously. That is, in the case where the target speaker saying the wrong password or even in the case where an impostor knowing and saying the correct password, the nonconformities will be detected and the authentications/accesses will be denied. Another objective of the present invention is to provide a method and apparatus that is not only easily implemented, but also generally comprises of at least four merits as follows: (1) The modality of lip motion is completely insensitive to the background noise; (2) The acquisition of lip motions is insusceptible to the distance; (3) Such a system is easily usable by a mute person; (4) The lip-password protected speaker verification system has its unique superiorities of silence and hidden property.

Citation or identification of any reference in this section or any other section of this document shall not be construed as an admission that such reference is available as prior art for the present application.

SUMMARY OF INVENTION

An embodiment of the present invention provides method and apparatus for a lip-password based speaker verification approach to a security system that merely utilizes one modality of lip motions, in which the private password information is embedded into the lip motions synchronously. The present invention guarantees that it will hold a double security to the access-controlled system, where the speaker is not only verified by his or her underlying dynamic characteristics of lip motions, but also required to match a specific password embedded in the lip motion simultaneously. That is, in the case where the target speaker saying the wrong password or even in the case where an impostor knowing and saying the correct password, the nonconformities will be detected and the authentications/accesses will be denied. The distinguishable subunits of the password associated with its corresponding lip motions will play an important role in verifying the wrong password and imposters. A further embodiment of the present invention provides method and apparatus that is not only easily implemented, but also generally comprises of at least four merits as follows: (1) The modality of lip motion is completely insensitive to the background noise; (2) The acquisition of lip motions is insusceptible to the distance; (3) Such a system is easily usable by a mute person; (4) The lip-password protected speaker verification system has its unique superiorities of silence and hidden property.

In another embodiment of the present invention the lip-based speaker verification system is implemented as part of one or more security systems.

In yet another embodiment of the present invention the lip-based speaker verification system is implemented across one or more computing hardware in one or more locations.

In a further embodiment of the present invention the method is implemented in software that is executable on one or more hardware platform.

Those skilled in the art will appreciate that the invention described herein is susceptible to variations and modifications other than those specifically described.

The invention includes all such variation and modifications. The invention also includes all of the steps and features referred to or indicated in the specification, individually or collectively, and any and all combinations or any two or more of the steps or features.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the invention and apply throughout. Unless otherwise defined, all other technical terms used herein have the same meaning as commonly understood to one of ordinary skill in the art to which the invention belongs.

Other aspects and advantages of the invention will be apparent to those skilled in the art from a review of the ensuing description.

BRIEF DESCRIPTION OF DRAWINGS

The above and other objects and features of the present invention will become apparent from the following description of the invention, when taken in conjunction with the accompanying drawings, in which.

DETAILED DESCRIPTION OF INVENTION

Figure 1:
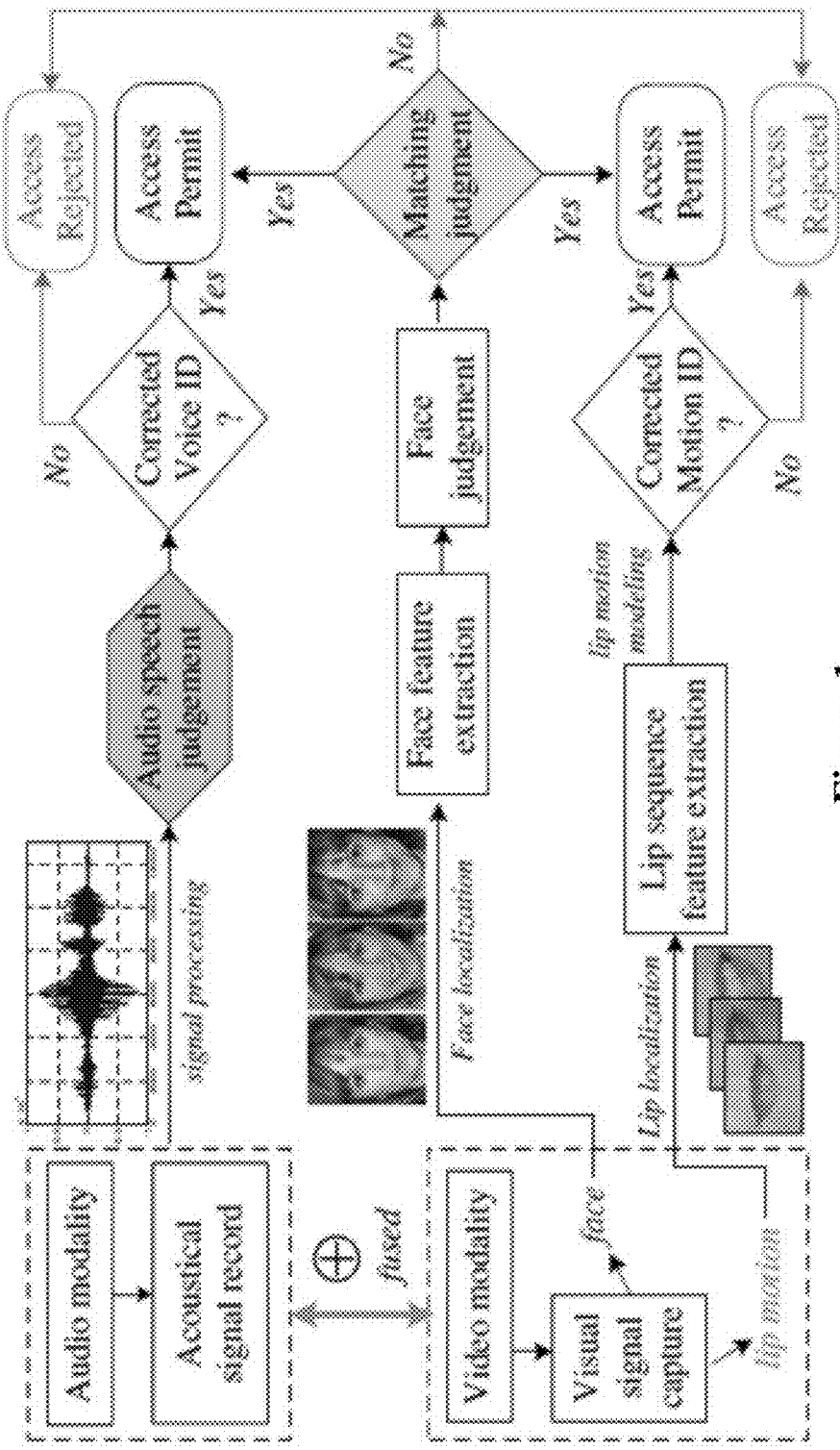
FIG. 1 shows the speaker verification systems based on different modalities, i.e., audio modality (acoustical signal) and video modality (face, lip motion)
Figure 2:
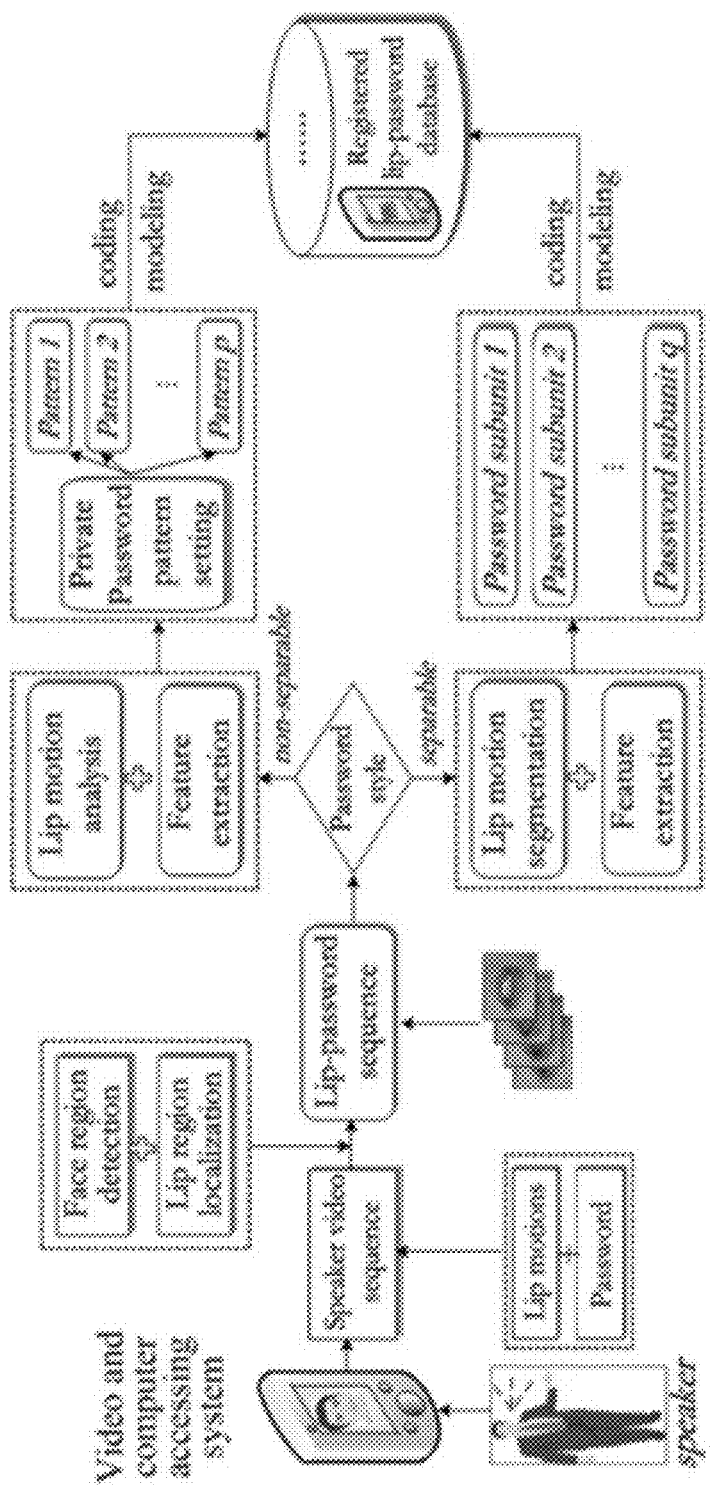
FIG. 2 shows the flowchart illustrating the block diagram of speaker registration phase within the lip-password based speaker verification system.
Figure 3:
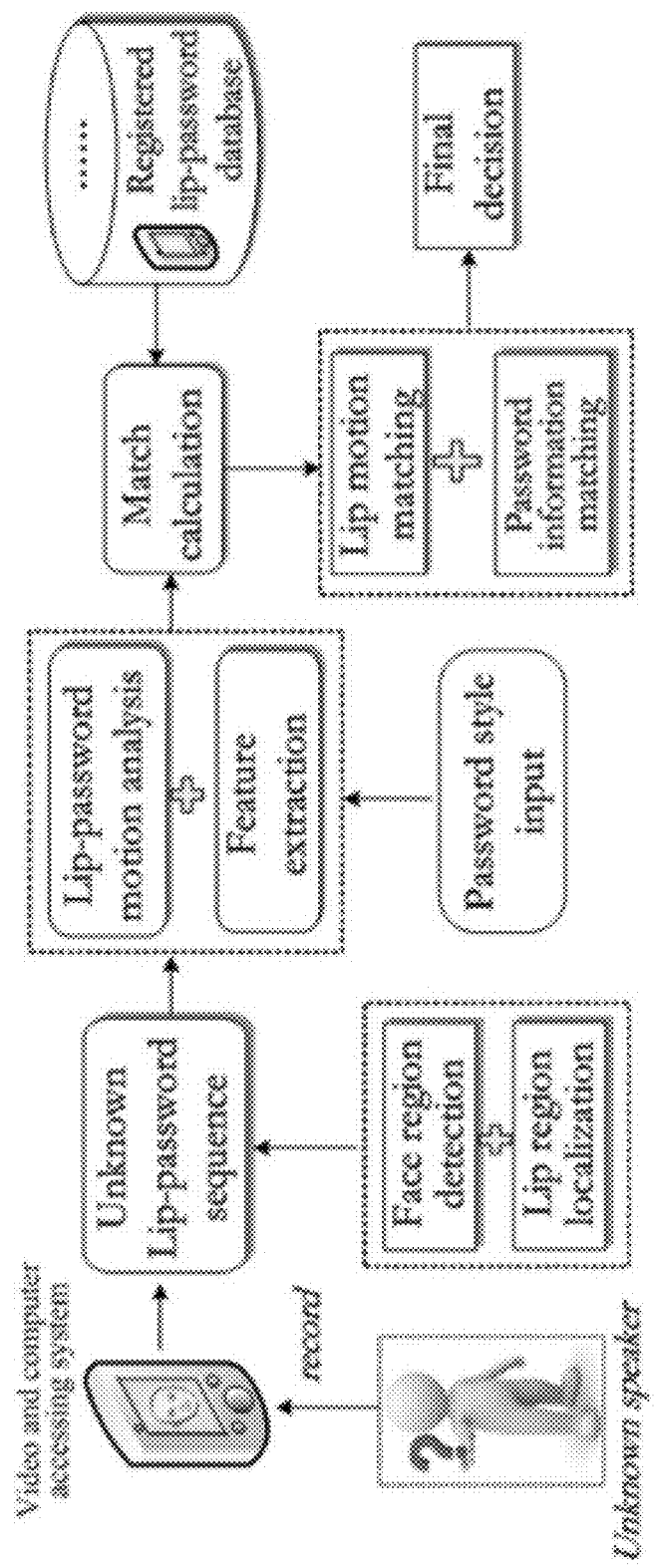
FIG. 3 shows the flowchart illustrating the block diagram of speaker verification phase within the lip-password based speaker verification system.
Figure 4:
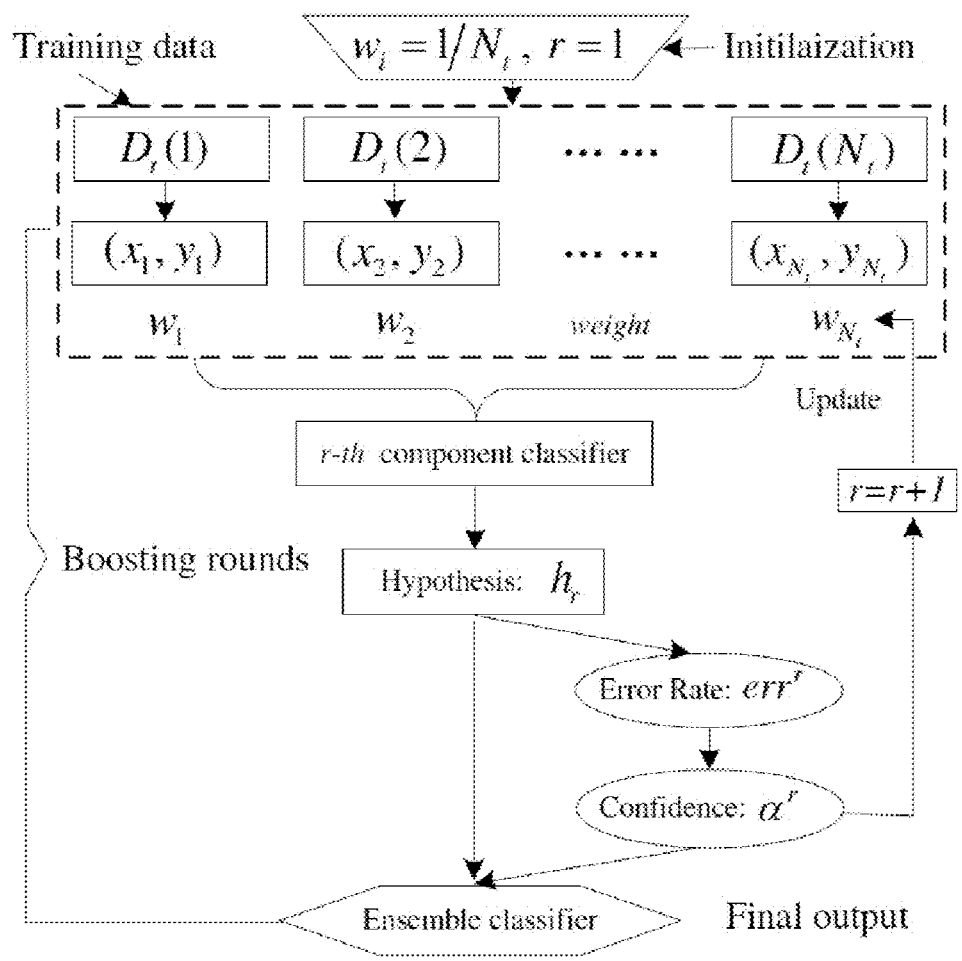
FIG. 4 shows the block diagram of the Adaboost learning algorithm.

The present invention is not to be limited in scope by any of the specific embodiments described herein. The following embodiments are presented for exemplification only.

One embodiment of the present invention provides a method and apparatus for a lip-password based speaker verification approach to a security system that merely utilizes one modality of lip motions, in which the private password information is embedded into the lip motions synchronously. Another embodiment of the present invention guarantees that it will hold a double security to the access-controlled system, where the speaker is not only verified by his or her underlying dynamic characteristics of lip motions, but also required to match a specific password embedded in the lip motion simultaneously. That is, in the case where the target speaker saying the wrong password or even in the case where an impostor knowing and saying the correct password, the nonconformities will be detected and the authentications/accesses will be denied. A further embodiment of the present invention provides method and apparatus that is not only easily implemented, but also generally comprises of at least four merits as follows: (1) The modality of lip motion is completely insensitive to the background noise; (2) The acquisition of lip motions is insusceptible to the distance; (3) Such a system is easily usable by a mute person; (4) The lip-password protected speaker verification system has its unique superiorities of silence and hidden property. Thus, in order to gain some insights into embodiments of the present invention, two important issues that needs to be considered: (1) The appropriate visual features aiming at characterizing each lip frame should be extracted; (2) The lip motions belonging to each element (i.e. subunit) need to be separated. Hence, this section firstly discusses feature extraction and lip motion segmentation. Then, a multi-boosted HMMs learning approach is presented as an embodiment of the present invention.

Feature Extraction

It is well known that the visual cues of lip movement not only contain important speech relevant information, but also characterize the speaker's identity, which can be utilized for speaker verification. Hence, the suitable visual features extracted from the recorded lip sequences should contain significant information for lip motion modelling so that the lip-password utterances between different categories can be well differentiated.

In the last decade, various sets of visual feature vectors have been proposed to characterize each lip frame, which can be roughly classified into two branches: contour-based features and area-based features. In the contour-based feature, the geometric shape parameters such as mouth area, perimeter, height and width derived from the binary mouth image, can be chosen as the visual feature vector. The temporal variations of these parameters can be utilized to describe the lip motion activities. Kaynak et aL in M. N. Kaynak, Z. Qi, A. D. Cheok, K Sengupta, J. Zhang, and C. Ko Chi, "*Analysis of lip geometric features for audio-visual speech recognition,*" *IEEE Transactions on Systems, Man, and Cybernetics Part A: Systems and Humans*, vol 34, no. 4, pp. 564-570, 2004 conducted a comprehensive investigation on the contour-based features for lip motion analysis. In the area-based features, as the teeth, tongue and black hole always appear in oral cavity during the utterance, image transforms of the region of interest (ROI) such as Principal Component Analysis (PCA), Independent Components Analysis (ICA), Discrete Wavelet Transform (DWT) and two dimensional Discrete Cosine Transform (2D-DCT), have shown their effectiveness in lip motion analysis.

Nevertheless, it is quite difficult to determine which kind of feature has more discrimination power compared to the others. As reported in H. E. Cetingul, Y Yemez, E. Engin, and A. M. Tekalp, "*Discriminative analysis of lip motion features for speaker identification and speech-reading,*" IEEE Transactions on Image Processing, vol 15, no. 10, pp. 2879-2891, 2006, the combination of contour-based and area-based visual features generally yields an acceptable performance for visual speaker verification and identification. Hence, the integration of multiple kinds of feature is desirable for robust lip motion based speaker verification. In our approach, PCA and 2D-DCT projections are selected to extract the area-based features, whereby characterizing the main components of each frame during the lip movements.

Figure 5:
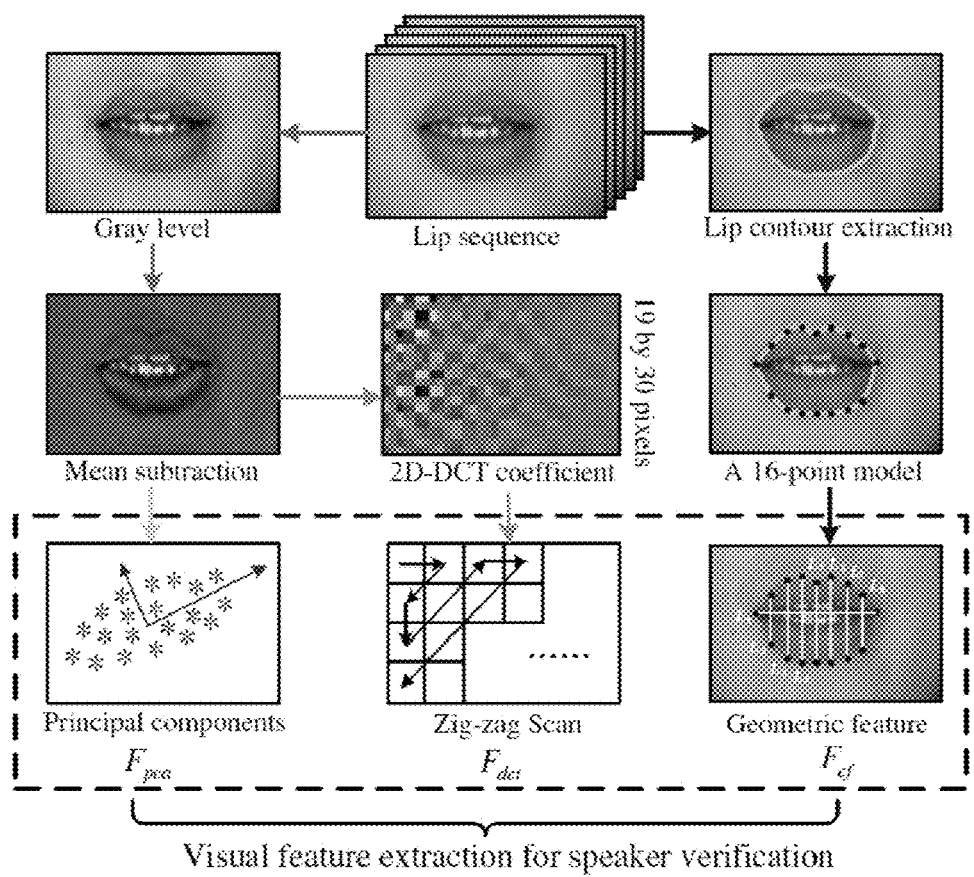
FIG. 5 shows the visual feature extraction for lip motion based speaker verification.

As shown in FIG. 5, we initially crop the mouth regions of interest (ROI) from the recorded lip sequences using the previous proposed method. Then, we utilize the lip contour extraction and tracking algorithm to extract the lip contours frame by frame and employ a 16-point lip model proposed by Wang et aL in S. L. Wang, W. H. Lau, and S. H. Leung, "*Automatic lip contour extraction from color images,*" Pattern Recognition, vol 37, no. 12, pp. 2375-2387, 2004 to compute nine geometric shape parameters, i.e., maximum horizontal distance, seven vertical distances and mouth area, denoted as $\{L_1, L_2, L_3, L_4, L_5, L_6, L_7, L_8, A_c\}$ to model the contour-based feature vector ($F_{cf}$). These geometric shape parameters are normalized with respect to the corresponding values of the first lip frame. Subsequently, during the pre-processing phases of extracting area-based features, the previous cropped raw ROIs are converted into gray level case, and the illumination equalization method proposed by Liew et aL in A. W. C. Liew, S. H. Leung, and W. H. Lau, "*Lip contour extraction from color images using a deformable model,*" Pattern Recognition, vol 35, no. 12, pp. 2949-2962, 2002 is adopted to reduce the effects of uneven illuminations. Meanwhile, to reduce the effect of different illumination conditions during the data set capturing, all the pixel values of incoming ROIs are normalized to have a similar distribution characteristic. Subsequently, mean subtraction is performed for each pixel point to remove the basis effect of unwanted constant variations across each utterance. In the application of PCA and 2D-DCT projections, the principal components of top $N_{pca}$ numbers are chosen as PCA features ($F_{pca}$), while the first M 2D-DCT coefficients along the Zig-zag Scan order are selected as the 2D-DCT features ($F_{dct}$). Often, a size of $N_M$ by $N_M$ triangular mask is utilized to extract such 2D-DCT coefficients of $$M = \frac{N_M(N_M+1)}{2}$$

length for each lip frame. Consequently, the jointly visual feature vector $\{F_{cf}, F_{pca}, F_{dct}\}$ is obtained.

Lip Motion Segmentation

The distinguishable subunits of the password associated with its corresponding lip motions will play an important role in verifying the wrong password and imposters. Lip motion segmentation aims at detecting the starting and ending frames of subunit utterance from a sequence of lip frames. In the literature, to the best of our knowledge, there are two representative works towards lip motion segmentation using visual speech signals purely: (1) Yau et aL in W C. Yau, H. Weghorn, and D. K Kumar, "*Visual speech recognition and utterance segmentation based on mouth movement,*" Digital Image Computing Techniques and Applications, vol 0, pp. 7-14, 2007 adopted motion history images (MHIs) to compute the intensity variations via a whole region-based shape descriptor (called Zernike moments) and spline curve fitting techniques to generate the difference between consecutive frames. Accordingly, some peak points can be detected to represent the starting and stopping positions of the subunit elements; (2) Mak et aL in M. W Mak and W G Allen, "*Lip-motion analysis for speech segmentation in noise,*" Speech Communication, vol 14, no. 3, pp. 279-296, 1994 attempted to locate the boundaries of subunit by utilizing the velocity of the lips from image sequences that are estimated by a combination of morphological image processing and block matching techniques. From a practical viewpoint, both MHIs and lip velocity are required to compute the whole regional characteristic in each frame, whose computation is quite laborious. By rule of thumb, the mouth areas of a lip-password consisting of isolated words always change significantly over time. The position with minimum mouth point always represents the status of mouth closing or intersection point between subunit utterances. Based upon this information, we present a simple but effective lip motion segmentation approach to segment the lip-password sequence into several distinguishable subunits according to the variations of mouth areas.

As introduced in the previous section, the variations of mouth area can be obtained via contour-based feature extraction phase. The proposed lip motion segmentation approach consists of three phases as follows:

1. Firstly, we obtain the signal $A_c$ in terms of the mouth area variations via lip tracking using our recently proposed approach in X. Liu and K. M. Cheung, "*A robust lip tracking algorithm using localized color active contours and deformable models,*" in Proc. IEEE International Conference on Acoustics, Speech, and Signal Processing, 2011, pp. 1197-1200.
2. Next, we utilize the forward-backward filtering to process the input area signal $A_c$ in both the forward and backward directions. The resultant signal $A_c^f$ has precisely zero phase distortion and magnitude while the other filters such as Gaussian filter may change the position of peak or valley point significantly. The interested readers may refer to F Gustafsson, "*Determining the initial states in forward-backward filtering,*" IEEE Transactions on Signal Processing, vol 44, no. 4, pp. 988-992, 1996 for the details.
3. Finally, we can easily obtain the positions of peak points and valley points of the filtered signal $A_c^f$, where the positions of the peak points always represent the mouth opening widely while valley points often denote the mouth closed a little bit. We take such valley points into consideration because these points always represent the connection between the neighboring subunits. In digital lip-password scenario, speakers usually keep the same speaking pace during the utterance. Therefore, the frame length of each subunit differs not quite much from each other. Often, the frame length of the whole password utterance and the number of elements in password are recorded to be known. Accordingly, the position of the starting frame of the current subunit, i.e., the ending frame of the previous subunit, can be computed within a pre-defined threshold $\Delta T$ as follows:

$$\begin{cases} T_{left} \leq P_e^1 \leq T_{right} \\ P_e^{i-1} + T_{left} \leq P_e^i \leq P_e^{i-1} + T_{right} \end{cases} \quad (10)$$

where $$T_{left} = \frac{N_{frame}}{N_{element}} - \Delta T$$

and $$T_{right} = \frac{N_{frame}}{N_{element}} + \Delta T$$

are the left and right threshold values, respectively.

Figure 6:
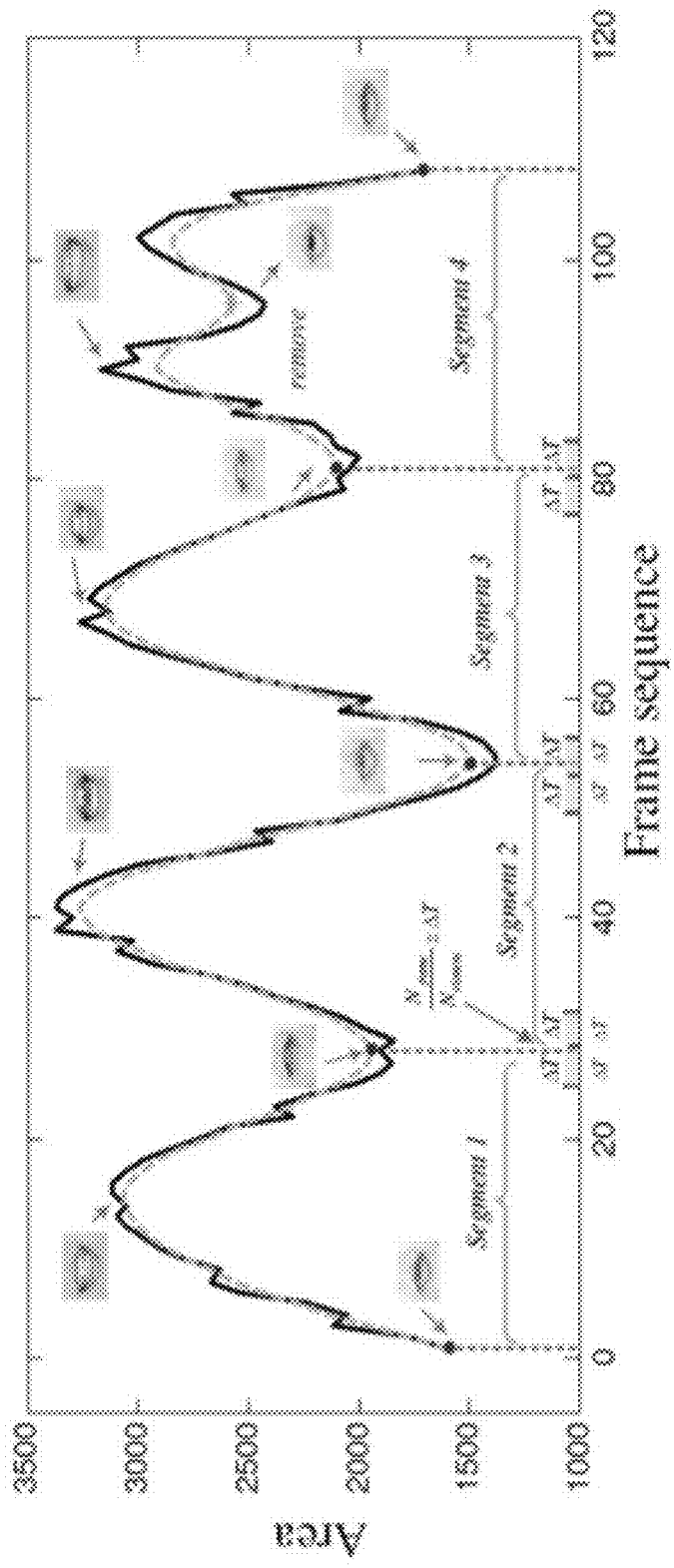
FIG. 6 shows the lip motion segmentation of the lip-password "6-5-8-7". Solid line: original signal in terms of mouth area variations; Dotted line: filtered signal via forward-backward filtering.

FIG. 6 shows an example, in which it can be seen that the solid curve representing the area variations of the lip-password utterance "6-5-8-7" has many peak or valley points. In contrast, the dotted curve describing the processed signal performed by forward-backward filtering shows only some major peak or valley points. According to the constrains of the frame length of subunits, the proposed valley point searching method can successfully find the intersection points between neighboring subunits. Meanwhile, the valley point that does not belong to intersection points can be removed. Consequently, the lip motion belongs to each subunit can be successfully separated.

The Proposed Multi-boosted HMMs Learning Approach

As described in a previous section, the boosted HMMs method can be selected for lip motion analysis, featuring on verifying some hard-to-classify examples. In general, let the positive value denote the target speaker and the negative value represent an imposter speaker. According to Equation (2) and Equation (3), the decision stump for each weak learner in boosted HMMs can be formulated as:

$$h(O_s) = \begin{cases} +1, & \text{if } LLR(O_s) \text{ or } NLL(O_s) \geq \tau \\ -1, & \text{otherwise} \end{cases} \quad (11)$$

---

Algorithm 1: Random Subspace Ensemble Method

Input:
1. Feature data set, D = {$f_j$, $t_j$}, $1 \leq j \leq n$, $t_j \in C$.
2. Subspace dimension d < n.
3. A weak learning algorithm L.
4. The number of the basic learner $N_l$.

Output:
5. Final hypothesis $\hat{h}$.

Begin:
6. for m = 1, ..., $N_l$ do
7. $D_i^*$ = RSM_Projection(D, d).
8. $h_m$ = L($D_i^*$).
9. end for 10. $$\hat{h}(f) = \arg\min_{t \in C} \sum_{m=1}^{N_l} [h_m(f) = t].$$

end.

---

As introduced in the previous section, the lip motions of the lip-password utterance are usually comprised of several distinguishable units, which can be successfully separated using the proposed lip motion segmentation algorithm. Hence, each subunit can be modeled and verified using boosted HMMs individually. During the training process of the boosting learning framework, the frame length of the segmental units can be easily aligned to be the same using cubic interpolation method. Hence, by integrating the superiority of segmental scheme and boosting learning ability, the whole lip-password utterance can be verified via the combination of multi-boosted HMMs, whereby its discrimination power upon the whole utterance is stronger than a single HMM classifier. Nevertheless, simply utilization of the whole feature vectors may not achieve a satisfactory classification performance due to features redundant or over-fitting problem. As investigated by Ho et aL T K Ho, "The random subspace method for constructing decision forests," IEEE Transactions on Pattern Analysis and Machine Intelligence, vol 20, no. 8, pp. 832-844, 1998, the random subspace method (RSM) has been successfully utilized in ensemble approaches and demonstrated to perform well when there is a certain redundancy in the collection of feature vectors of the data set. Tao et aL in D. Tao, X. Tang, X. Li, and X. Wu, "Asymmetric bagging and random subspace for support vector machines-based relevance feedback in image retrieval" IEEE Transactions on Pattern Analysis and Machine Intelligence, vol 28, pp. 1088-1099, 2006 also investigated that RSM can successfully avoid the occurrences of over-fitting problem when the size of training set is relatively small compared to the high dimensionality of the feature vector. The basic random subspace ensemble method is given in Algorithm 1, it can be found that this kind of approach can generate different types of feature subsets for ensemble classification. Inspired by these findings, RSM is thus adopted to select different feature subsets from the original feature vectors randomly so that various kinds of lip motion models can be learned. Such an operation can enhance the discrimination capability, meanwhile reducing the computation cost in ensemble approaches.

Nevertheless, as reported in D. Tao, X. Tang, X. Li and X. Wu, "Asymmetric bagging and random subspace for support vector machines-based relevance feedback in image retrieval" IEEE Transactions on Pattern Analysis and Machine Intelligence, vol 28, pp. 1088-1099, 2006, boosting method is especially utilized for large training sample sizes while the RSM is susceptible to inadequate training samples. However, a small number of training samples are usually available for speaker verification system because it is not amiable to ask the test speakers to repeat their private phrases for a lot of times. Under the circumstances, we employ the data sharing scheme (DSS) proposed by Wang et aL in X. Wang, C. Zhang, and Z. Zhang, "Boosted multi-task learning for face verification with applications to web image and video search," in Proc. IEEE International Conference on Computer Vision and Pattern Recognition, 2009, pp. 142-149 to form a novel train data set in pairs, which has the ability to overcome the limitation of the small sample size problem to some extent. Specifically, suppose there are a set of positive examples A={$x_1^a, x_2^a, \ldots, x_{N_a}^a$} of the target speaker and a set of negative examples B={$x_1^b, x_2^b, \ldots, x_{N_b}^b$} of imposter excluding the target speaker. From A and B, we form a training set, where the positive examples are the pairs of the ones that are both from A, i.e., {$x_i^a, x_j^a$}, and negative examples {$x_i^a, x_j^b$} are the pairs of examples that are from A and B, respectively. As the imposters may have many different categories, it is very difficult, if not impossible, to utilize one single model to represent all the imposters. Hence, we prefer not to train the imposter models. Let $\lambda$ be an HMM trained via data set A of the target speaker, it can be concluded that the NLL of $x_i^a$ of the target speaker conditioned on $\lambda$ should be larger than the NLL of x of the imposter conditioned on $\lambda$. Thereupon, we define a similarity score $h(x_i^a, x, \lambda)$ between $x_i^a$ and x as follows:

$$h(x_i^a, x, \lambda) = |NLL(x_i^a, \lambda) - NLL(x, \lambda)| \quad (12)$$

The value of $h(x_i^a, x, \lambda)$ is small if x belongs to the target speaker and large when x belongs to the imposter. By setting an appropriate threshold $\tau$, the similarity between the testing example x and the whole positive data set A is measured as:

$$\hat{h}_{min} = \min_{x_i^a \in A} h(x_i^a, x, \lambda). \quad (13)$$

where x belongs to the target speaker if $\hat{h}_{min} \leq \tau$, and imposter otherwise. In other words, we compare the test example with all the examples of the positive data set A and take the highest score (i.e., minimum value) to make the decision. Due to the plenty of HMMs are trained individually in ensemble learning approaches, the reduction of the computational load per HMM is also an important issue we should consider. Therefore, the Baum-Welch algorithm is adopted to estimate the parameters for each HMM. As introduced in S. W Foo, Y. Lian, and L. Dong, "*Recognition of visual speech elements using adaptively boosted hidden markov models*," IEEE Transactions on Circuits and Systems for Video Technology, vol 14, no. 5, pp. 693-705, 2004, the hard-to-classify samples should be treated differently in estimating the parameters. Therefore, the biased Baum-Welch estimation is thus adopted for parameter learning in boosted HMM. For an N-state-M-symbol HMM $\lambda=(\pi, A, B)$ of the target speaker, we denote the set of K training observation sequences of the target speaker as:

$$O=\{O_1, O_2, \ldots, O_K\} \quad (14)$$

where $O_k = \{o_1^k, o_2^k, \ldots, o_{l_k}^k\}$ is the $k^{th}$ observation sequence and each observation sequence is independent of each other. The goal of the Baum-Welch algorithm is to adjust the parameters of the model 2 to maximize:

$$P(O|\lambda_i) = \prod_{k=1}^{K} P(O_k|\lambda) = \prod_{k=1}^{K} P_k. \quad (15)$$

As shown in [27], we define the forward variables $\alpha_t^k$%$(i) = P(o_1^k, o_2^k, \ldots, o_t^k, s_t = S_i|\lambda)$ and backward variables $\beta_t^k(i) = P(o_{t+1}^k, o_{t+2}^k, \ldots, o_{l_k}^k|s_t = S_i, \lambda)$ for observation $O_k$. Subsequently, the parameters of HMM are estimated via Baum-Welch algorithm, i.e.

$$\bar{a}_{i,j} = \frac{\sum_{k=1}^{K} \frac{1}{P_k} \sum_{t=1}^{l_k-1} \alpha_t^k(i) a_{i,j} b_j(O_{t+1}^k) \beta_{t+1}^k(j)}{\sum_{k=1}^{K} \frac{1}{P_k} \sum_{t=1}^{l_k-1} \alpha_t^k(i) \beta_t^k(j)} \quad (16)$$

$$\bar{b}_j(l) = \frac{\sum_{k=1}^{K} \frac{1}{P_k} \sum_{\substack{t=1 \\ s.t. O_t = v_l}}^{l_k-1} \alpha_t^k(i) \beta_t^k(j)}{\sum_{k=1}^{K} \frac{1}{P_k} \sum_{t=1}^{l_k-1} \alpha_t^k(i) \beta_t^k(j)} \quad (17)$$

where $v_l$ is the $l^{th}$ ($1 \leq l \leq M$) symbol output. In this strategy, all the samples are treated equally. In biased Baum-Welch estimation, a weight obtained in boosting learning framework is assigned to each sample. In our boosted HMMs approach, the training samples are formulated in pairs via DSS. For the target speaker of K samples, the number of positive training data set is equal to $$\frac{K(K-1)}{2}.$$

Let $w_{i,j}^T$, ($1 \leq j < j \leq K$) denote the weight of the coupled training sample $\{O_i, O_j\}$ of the target speaker, the normalized weight for original target sample $O_k$ ($1 \leq k \leq K$) is formulated as:

$$\omega_k = \frac{\sum_{i=k \text{ or } j=k} w_{i,j}^T}{2 \cdot \sum_{i,j} w_{i,j}^T}. \quad (18)$$

By assigning this weight to the sample $O_k$, the newly re-estimated parameters become:

$$\hat{a}_{i,j} = \frac{\sum_{k=1}^{K} \frac{\omega_k}{P_k} \sum_{t=1}^{l_k-1} \alpha_t^k(i) a_{i,j} b_j(O_{t+1}^k) \beta_{t+1}^k(j)}{\sum_{k=1}^{K} \frac{\omega_k}{P_k} \sum_{t=1}^{l_k-1} \alpha_t^k(i) \beta_t^k(j)} \quad (19)$$

$$\hat{b}_j(l) = \frac{\sum_{k=1}^{K} \frac{\omega_k}{P_k} \sum_{\substack{t=1 \\ s.t. O_t = v_l}}^{l_k-1} \alpha_t^k(i) \beta_t^k(j)}{\sum_{k=1}^{K} \frac{\omega_k}{P_k} \sum_{t=1}^{l_k-1} \alpha_t^k(i) \beta_t^k(j)}. \quad (20)$$

Figure 7:
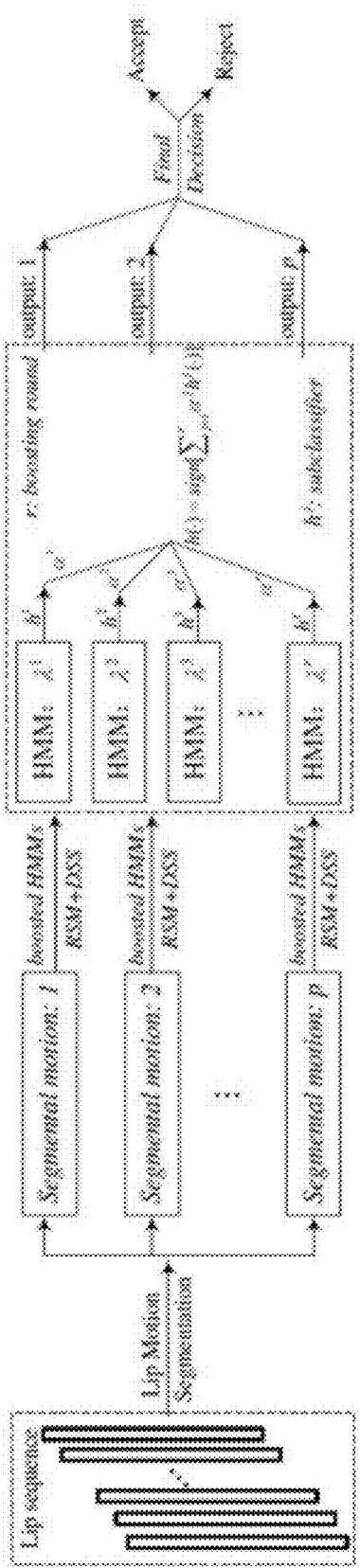
FIG. 7 shows the proposed multi-boosted HMMs learning approach to digital lip-password based speaker verification.

This kind of parameter estimation approach can generate a better model, especially for verifying hard-to-classify samples. Therefore, for each subunit, we integrate HMMs with boosting learning framework associated with the RSM and DSS to discriminatively model the subunit sequence so that a precise decision boundary can be obtained for the verification of these subunits. Finally, as shown in FIG. 7, the whole lip-password whether spoken by the target speaker or not is verified according to all the verification results of the subunits learned from multi-boosted HMMs. In summary, the proposed multi-boosted HMMs learning approach is described in Algorithm 2.

---

Algorithm 2: Multi-boosted HMMs for speaker verification.

---

Input:
    1.    Lip-password sequences of the training data set, D.
    2.    The number of the password components: p, RSM sampling percentage $P_{rsm}$, and boosting round R.
Preprocessing:
    3.    Visual feature extraction for each lip frame.
    4.    Lip motion segmentation, $D = \{D_1, D_2, \ldots, D_p\}$.
Multi-boosted HMMs:
    5.    for m = 1, ..., p do
    6.    Get the training set $D_m^T = \{X_1^T, X_2^T, \ldots, X_{N_a}^T\}$ of the target speaker and $D_m^I = \{X_1^I, X_2^I, \ldots, X_{N_b}^I\}$ of the imposter, and form a novel training set using DSS [42].

-continued

Algorithm 2: Multi-boosted HMMs for speaker verification.

7. Initialize weights $w_{i,j}^T = \frac{2}{N_a(N_a-1)}$ with $1 \le i \le j \le N_a$, and $w_{i,j}^I = \frac{1}{N_a N_b}$ with $1 \le i \le N_a$, $1 \le j \le N_b$; $r = 0$; $\epsilon^0 = 0$.

8. while $r \le R$ and $\epsilon^r < 0.5$ do
9.     Normalize the weights:

$$w_{r,i,j}^T = \frac{w_{r,i,j}^T}{\Sigma_{i',j'} w_{i',j'}^T + \Sigma_{i',j'} w_{i',j'}^I}$$

$$w_{r,i,j}^I = \frac{w_{r,i,j}^I}{\Sigma_{i',j'} w_{i',j'}^T + \Sigma_{i',j'} w_{i',j'}^I}$$

10.     RSM sampling the feature vectors of $P_{rsm}$ %
        dimensionality in positive data set $D_m^T$ and
        build an HMM: $\lambda_m^r(T)$ via Equation (19) and
        Equation (20).
11.     Call WeakLearner learning with respect to
        Equation (11).
12.     Train a threshold $\tau_m$ to minimize the weighted
        classification error:
        $\epsilon^r = \Sigma_{i,j} w_{i,j}^T e_{r,i,j}^T + \Sigma_{i,j} w_{i,j}^I e_{r,i,j}^I$,
        where $e_{r,i,j}^T = 1$ if
        $h_m^r(X_i^T, X_j^T, \lambda_m^r(T)) \ge \tau_m$
        and 0 otherwise. Also, $e_{r,i,j}^I = 1$ if
        $h_m^r(X_i^T, X_j^T, \lambda_m^r(T)) < \tau_m$
        and 0 otherwise.

13.     Set $\alpha_m^r = \frac{1}{2} \log[(1 - \epsilon^r)/\epsilon^r]$.

14.     Update the weights to be:
        $w_{r+1,i,j}^T = w_{r,i,j}^T \cdot \exp(2\alpha_m^r e_{r,i,j}^T)$
        $w_{r+1,i,j}^I = w_{r,i,j}^I \cdot \exp(2\alpha_m^r e_{r,i,j}^I)$
15.     $r = r + 1$.
16. end while
17. Obtain the similarity score between $X_p^T$ and $X_q$,
    where $X_p^T$ is from the data set of the target speaker:
    $\hat{h}_m(X_p^T, X_q) = \Sigma_{w=1}^r \alpha_m^w h_m^w(X_p^T, X_q, \lambda_m^w(T))$.
18. end for Output:

19. Given the test lip-password sequence $V = \{v_1, v_2, \ldots, v_p\}$, each subunit is verified via Equation (13):
    $\hat{h}_{min}^m = \min_{X_i^T \in D_m^T} \hat{h}_m(X_i^T, v_m)$.
    If $\hat{h}_{min}^m \le \tau$ for $m = 1, \ldots, p$, lip-password V is verified
    to be uttered by target speaker and otherwise not.

Experimental Results and Discussion

An HD-capable camera was utilized to capture the frontal views of 46 speakers (28 males, 18 females) in 30 frames per second (fps) under the uniform lighting conditions. In the data set, all speakers were asked to repeat the fixed digit password three-one-seven-five (3175) for twenty times ($D_p$) and randomly spoke another ten 4-digit different password covering all 0-9 digits, denoted as ($D_r$). All the password phrases are recorded with the same speaking pace. The located and resized ROIs of lip images are of 112×76 pixels.

The verification performance of the system was evaluated by equal error rate (EER), which is calculated as the operating point, where the false acceptance rate (FAR) equals false rejection rate (FRR) by setting an appropriate threshold. FAR and FRR are formulated as follows:

$$FRR = 100 \times \frac{F_r}{N_a}, FAR = 100 \times \frac{F_a}{N_r}. \qquad (21)$$

where $F_r$ and $F_a$ are the number of false rejection and false acceptance, $N_a$ and $N_r$ are the total number of the testing examples for the target speaker and imposter clients, respectively. A practical way to calculate the optimal threshold is to sort the value of FAR and FRR, whereby finding the score value provided that the fraction of score value is less than the fraction of FAR but a bit greater than the fraction of FRR.

In the proposed multi-boosted HMMs learning approach, we utilized a left to right HMM with six hidden states to train the lip motion models. Each hidden state incorporated two continuous density Gaussian mixtures with diagonal covariance matrix output. $\Delta T$ was set at 5 for lip motion segmentation and the frame length of the segmental subunit was aligned at 30 for training. The boosting round was set at 30. The selected dimensionality of the PCA feature vector was equal to 80. A 13×13 triangular mask was utilized to extract 2D-DCT coefficients of 91 dimensionality. Hence, the resultant total dimension for the whole extracted feature vector was equal to 180. As the lip-passwords differing from the registered one and uttered by the different speakers can be easily distinguished using the existing lip motion modeling and classification methods due to their apparent dissimilarity, we mainly focus on the following two cases: (1) the target speaker saying the incorrect passwords case, and (2) the imposter saying the correct password one, respectively.

Case: The Target Speaker Saying the Incorrect Passwords

For the case where the target speaker saying the incorrect passwords, the utterances of the lip-password differing from the registered one (i.e. 3157) are considered as imposters. The database $D_p$ is divided into two disjoint data sets: $D_{p_1}$ and $D_{p_2}$, each of which has ten repetitions of the same password from each speaker. The subset $D_{p_1}$ is utilized for training, while $D_{p_2}$ is utilized for testing. Since there are 46 speakers, ten repetitions of the fixed lip-password are selected for true target clients $D_{p_2}$ and ten different lip-password are chosen for imposter clients $D_r$, the total number for the true acceptance and true rejection becomes $N_a$=460 and $N_r$=460, respectively.

The model of the target speaker can be trained through the correct lip-password sequence $D_{p_1}$. Since the utterances of different lip-password are selected to be imposter, the imposter model cannot be well determined due to its arbitrariness. In this situation, the proposed lip motion segmentation scheme has the ability to make the imposter categories determined (i.e. the digits only from "0" to "9") while the whole utterance fails. Accordingly, as introduced in an earlier section, such a speaker verification problem can be extensionally formulated as open-set and close-set verification problems. For the open-set case, given a test utterance, each segmental unit of test sequence can generate an acceptance or rejection result according to Equation (3) by setting a decision threshold. If all the segmental motions meet the accepted condition, the test lip-password will be regarded as the one uttered by target-speaker with the pre-registered lip-password; otherwise, it will be an imposter. For the close-set case, the imposters are generated via leave-one-out scheme [5], where each segmental unit not belonging to the subunit of the fixed order of the lip-password is selected as imposter data. For instance, all the subunits segmented from the enrolled data set differing from the target subunit "3" are considered to be the imposter units. Every segmental motion of digits "0-2, 4-9" is all the imposters of subunit motion "3". Meanwhile, for each segmental unit, the imposter categories are no more than 9. We randomly selected one segmental unit of each digit "0-9" from $D_{pi}$ and $D_r$ to form the imposter data. The DSS introduced in an earlier section was employed to form the training data set in pairs. Accordingly, the total number for positive training examples and negative training examples was equal to 45 and 90, respectively. Considering all the lip motion features extracted in the earlier section of this document, we tested the performance of the proposed approach on different feature combinations in comparison with the existing counterparts, in which the procedures of boosted GMMs approach and boosted HMM were utilized for lip motion analysis to make a comparison. Table 1 lists the experimental results.

more attention on hard-to-classify samples holds the promise of verifying these very hard-to-classify examples. However, the boosted GMM and boosted HMM may not always deliver a better result than non-boosted methods due to the feature overfitting problem and the limited training samples associated with the whole frame sequence. In contrast, the proposed multi-boosted HMMs learning approach incorporating the superiority of segmental scheme and boosting learning ability associated with RSM and DSS does not only make the imposter category determinable, but also has the ability to solve the feature overfitting and small training sample size problem. Consequently, the significant improvement in verification performance is obtained. The values of EER are all less than 10% when dealing with different kinds of feature vectors. In particular, feature subspace of 70% dimensionality of the feature vector $F_{cf}+F_p+F_{dct}$ yields a better satisfactory performance, in which the value of EER is only equal to 3.91%.

TABLE 1

The verification result of the target speaker saying the wrong password case.

Equal Error Rate [EER %] (The operating point where the FAR equals to FRR)

| Feature set | GMM [46] | HMM [10] | Segmental + GMM | Segmental + HMM | boosted GMM [47] | boosted HMM [26] | M-boosted HMM + RSM (70%) |
|---|---|---|---|---|---|---|---|
| $F_{cf}$ | 17.82 | 14.56 | 14.13 | 12.39 | 14.56 | 13.26 | 7.39 |
| $F_{pca}$ | 19.13 | 16.95 | 15.21 | 14.34 | 16.3 | 14.13 | 8.04 |
| $F_{dct}$ | 18.47 | 16.08 | 14.56 | 14.13 | 13.26 | 13.47 | 7.82 |
| $F_{cf}+F_{pca}$ | 13.47 | 11.52 | 10.21 | 10.43 | 12.39 | 10.86 | 4.34 |
| $F_{cf}+F_{dct}$ | 13.04 | 11.95 | 11.52 | 9.78 | 12.17 | 10.43 | 4.78 |
| $F_{pca}+F_{dct}$ | 13.91 | 12.6 | 11.08 | 10.65 | 12.82 | 11.73 | 5.21 |
| $F_{cf}+F_{pca}+F_{dct}$ | 12.17 | 12.39 | 11.73 | 11.3 | 13.91 | 11.08 | 3.91 |

It can be seen that the segmental modeling of lip-password, rather than simply taking the whole lip-password sequence into consideration, can achieve a better performance. This is because the sequence of the lip-password usually comprises of several subunits, and these subunits indicate a short period of lip motions. The segmental scheme has the ability of providing more detailed and significant information that is not easily revealed in the whole lip-password sequence. In case the whole lip-password sequence is adopted as the verification unit, it may not be well verified when the lip-password has little discrimination capability, e.g., the imposter password just has one different subunit which is so similar to the registered one. As a result, this subunit associated with the other subunits together may fail to be distinguished. Furthermore, it can be observed that the performance obtained by segmental modeling of lip-password outperforms the non-segmental modeling approaches both in the utilization of GMM and HMM methods. The value of EER is less than 10% when utilizing the segmental modeling approach associated with the feature vector $F_{cf}+F_{dct}$. Nevertheless, the direct adoption of segmental modeling scheme to achieve lip-password based speaker verification may not obtain the satisfactory performance because the subunits uttered by the same speaker do not differ pretty much so that it is very difficult to verify these subunits using a single GMM or HMM classifier. In contrast, the boosted learning framework aiming at paying The Imposter Saying the Correct Password As the lip-passwords differing from the registered one and uttered by the different speakers can be easily distinguished using the existing lip motion modeling and classification methods due to their apparent dissimilarity. Hence, we shall mainly focus on verifying the imposter saying the correct password. In this case, the subset $D_{p_1}$ was utilized for training while $D_{p_2}$ is adopted for testing. The resultant total number of trials for the true acceptance was $N_a=460$. We followed the leave-one-out scheme to generate the imposter samples, i.e., each speaker becomes an imposter data of the remaining speakers accordingly. Note that each test sample can be applied as an imposter for different target speakers simultaneously, i.e., the test lip-password sequence of the current speaker can be utilized for 45 times as the imposter datum among the other 45 speakers. Given the pre-defined target speaker of the data set $D_{p_2}$, i.e. 46 speakers, the total number of the imposter data excluding the target speaker for the true rejection is 450. The DSS introduced in the earlier section as employed to form the training samples in pairs. We randomly selected two examples of each speaker excluding the target speaker from subset $D_{p_1}$ to form the imposter training data of the current speaker. The experimental results are listed in Table 2.

TABLE 2

The verification result of the imposter saying the correct password case.

Equal Error Rate [EER %] (The operating point where the FAR equals to FRR)

| Feature set | GMM [46] | HMM [10] | Segmental + GMM | Segmental + HMM | boosted GMM [47] | boosted HMM [26] | M-boosted HMM + RSM (70%) |
|---|---|---|---|---|---|---|---|
| $F_{cf}$ | 23.29 | 19.14 | 17.44 | 14.61 | 15.69 | 13.31 | 9.78 |
| $F_{pca}$ | 22.23 | 18.24 | 17.18 | 14.47 | 16.12 | 13.74 | 8.58 |
| $F_{dct}$ | 21.11 | 17.55 | 17.07 | 13.94 | 15.32 | 11.98 | 7.63 |
| $F_{cf} + F_{pca}$ | 19.77 | 17.34 | 16.17 | 12.27 | 14.52 | 10.56 | 5.69 |
| $F_{cf} + F_{dct}$ | 19.33 | 16.22 | 15.27 | 12.76 | 14.26 | 11.02 | 5.37 |
| $F_{pca} + F_{dct}$ | 18.88 | 16.86 | 14.31 | 11.31 | 12.21 | 10.79 | 4.87 |
| $F_{cf} + F_{pca} + F_{dct}$ | 16.88 | 15.74 | 13.78 | 10.15 | 10.58 | 11.16 | 4.06 |

It can be found that the values of EER obtained by a single GMM or HMM based approaches are all higher than 15%. In fact, they always fail to verify most samples due to the following reasons: 1) There are many imposter categories, some of which are so similar that it is very difficult to verify such examples via taking the whole lip-password sequence as the basic verification unit; 2) The utilization of a single modeling and classification method is insufficient to differentiate some hard-to-classify speakers for their limited discrimination capability. In contrast, the segmental scheme can improve the verification performance to a certain degree because the segmental scheme can separate the long sequence into several short sequences. As a result, it can provide more detailed information to verify some similar imposters. Although the boosted learning methods have been demonstrated to be successful in increasing the robustness of the verification performance, the boosted GMMs and boosted HMMs approaches cannot achieve a satisfactory performance by taking the whole lip-password as the basic processing unit with the limited training samples. The values of EER are all higher than 10% when adopting different kinds of feature vectors. Comparatively speaking, the proposed multi-boosted HMMs learning approach integrating the advantages of the segmental scheme and boosted learning ability associated with the RSM and DSS, is able to learn the lip motion models discriminatively and sufficiently such that the promising verification results are obtained with the all values of EER less than 10%. In particular, the RSM with subspace dimensionality of 70% of original feature vector $F_{cf} + F_{pca} + F_{dct}$ using the proposed method yields a significantly higher performance in comparison with the other kinds of feature vectors, in which the value of EER is only equal to 4.06%.

Figure 8:
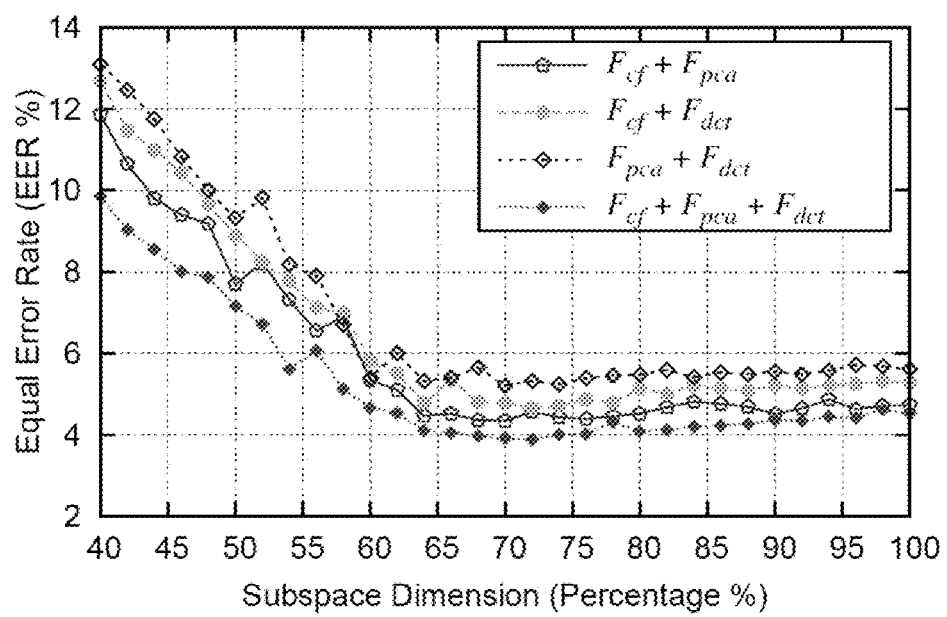
FIG. 8 shows the verification performance of the target speaker saying the incorrect passwords via different subspace dimensions.
Figure 9:
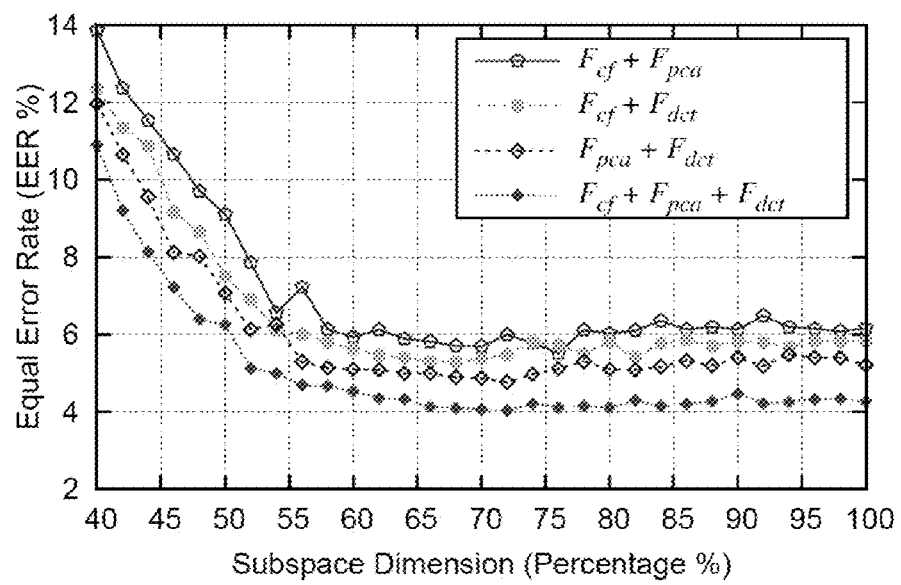
FIG. 9 shows the verification performance of the imposter saying the correct password via different subspace dimensions.

From the above two experimental results, it can further be found that the contour-based features $F_{cf}$ associated with $F_{pca}$ or $F_{pca}$ feature vector generally yield a higher performance in terms of lower EER value under the speaker-dependence case. This implies that the contour-based features play an important role in verifying different subunits of the lip-password. The reason lies that the lip contours always have diverse moving directions between different digital elements, while the movements of lip contours have the similar trajectories under the same digital elements. In contrast, under the same lip-password scenario, the texture features serve as an important discrimination information because the imposters are always generated from different speakers. Meanwhile, the values of EER performed on various subspace dimensions are shown in FIG. 8 and FIG. 9, respectively. It can be seen that the subspace dimension with 65-75% percentage of original feature vectors always generate the lower EER values, meanwhile the direct combination of all the extracted feature vectors of high dimensionality may not always generate the best performance due to the features redundant or overfitting problem. In contrast, the utilization of RSM resampling the feature vector into low dimensional subsets not only solves the overfitting problem, but also has the ability to reduce computation time significantly, especially in ensemble approaches.

It should also be noted that it would not obtain a good verification result when the size of subspace dimensionality is too small, because the weaker learners in boosting learning framework are not able to learn well when the data feature vectors are too uninformative. For instance, the subspace dimensionality with 40-50% of the original feature vector generates the unsatisfied results. As pointed in L. I. Kuncheva and C. J. Whitaker, "*Measures of diversity in classifier ensembles and their relationship with the ensemble accuracy,*" Machine Learning, vol 51, no. 2, pp. 181-207, 2003, diversity has been recognized as a very important factor to the success of classifier ensemble approaches. In boosting learning framework, the sampling distribution is employed to resample the training data sets for subsequent component classifier learning. Therefore, the likelihood for those samples which have been misclassified by the previous component classifier is increased so that the classifier ensemble grows progressively diverse. In addition, the utilization of RSM resampling the feature vector is capable of making each lip motion model diverse synchronously. That is, the predictions obtained from each component classifier are not equal such that the learned ensemble classifier becomes diverse as well.

CONCLUSIONS

In this document, we have proposed a novel multi-boosted HMMs learning approach to lip-password based speaker verification problem, in which the utilization of RSM has not only circumvented the occurrence of feature overfitting problem, but also has the capability of making each component classifier diverse and reducing the computation cost as well. The DSS reorganizing the training samples in pairs is able to solve the small training sample size problem in boosting learning framework. The experiments have shown a promising verification performance in comparison with the existing counterparts. The proposed approach can be readily applicable to other applications areas, e.g., audio speech recognition, handwriting recognition, and speaker identification, in which the observed data have several subunits.

INDUSTRIAL APPLICABILITY

The present invention discloses method and apparatus of a double security speaker verification system, where the speaker is verified by both of the lip-password and the underlying behavior characteristics of lip motions simultaneously, and the application thereof where systems can benefit from such speaker verification invention.

If desired, the different functions discussed herein may be performed in a different order and/or concurrently with each other. Furthermore, if desired, one or more of the above-described functions may be optional or may be combined.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

While the foregoing invention has been described with respect to various embodiments and examples, it is understood that other embodiments are within the scope of the present invention as expressed in the following claims and their equivalents. Moreover, the above specific examples are to be construed as merely illustrative, and not limitative of the reminder of the disclosure in any way whatsoever. Without further elaboration, it is believed that one skilled in the art can, based on the description herein, utilize the present invention to its fullest extend. All publications recited herein are hereby incorporated by reference in their entirety.

What is claimed is:

1. A lip-based speaker verification system for identifying a speaker, comprising one or more computer processors for executing a process of verification of identity of the speaker using one modality of lip motions;

wherein an identification key of the speaker comprising one or more passwords;

wherein the one or more passwords are embedded into lip motions of the speaker;

wherein the speaker is verified by underlying dynamic characteristics of the lip motions and extracted area-based features wherein the extracted area-based features further comprise teeth, tongue and oral cavity during the utterance; and wherein the speaker is required to match the one or more passwords embedded in the lip motions with registered information in a database such that the matching between the dynamic characteristics of the speaker lip motions and the extracted area-based features with the one or more passwords is verified by using one or more multi-boosted hidden Markov models (HMMs);

wherein the process comprises the steps of:

(1) extracting visual features for each lip frame;

(2) performing lip motion segmentation of D to yield $D=\{D_1, D_2, \ldots, D_p\}$ where D denotes the one or more passwords, and p is the number of password components;

(3) for each value of $m=1, \ldots, p$, performing the steps of:

(3.1) getting a training set $D_m^T = \{X_1^T, X_2^T, \ldots, X_{N_a}^T\}$ of the speaker and $D_m^I = \{X_1^I, X_2^I, \ldots, X_{N_b}^I\}$ of an imposer, and forming a novel training set using a data sharing scheme (DSS);

(3.2) initializing $w_{i,j}^T$, $w_{i,j}^I$, r and $\epsilon^0$ respectively with:

$$w_{i,j}^T = \frac{2}{N_a(N_a-1)}$$

for $$1 \leq i \leq j \leq N_a; w_{i,j}^I = \frac{1}{N_a N_b}$$

for $1 \leq i \leq N_a$ and $1 \leq j \leq N_b$; $r=0$; and $\epsilon^0=0$; where $w_{i,j}^T$ ($1 \leq i < j \leq K$) denotes the weight of a coupled training sample $\{O_i, O_j\}$ of the speaker, and $O_k$ ($1 \leq k \leq K$) is a kth observation sequence, and K is the number of observations;

(3.3) while $r \leq R$ and $\epsilon^r < 0.5$ where $\epsilon^r$ is a weighted classification error and R is a pre-determined number for each HMM to boost around, performing the steps of:

(3.3.1) updating $w_{r,i,j}^T$ and $w_{r,i,j}^I$ with $$w_{r,i,j}^T = \frac{w_{r,i,j}^T}{\sum_{i',j'} w_{i',j'}^T + \sum_{i',j'} w_{i',j'}^I}$$

and $$w_{r,i,j}^I = \frac{w_{r,i,j}^I}{\sum_{i',j'} w_{i',j'}^T + \sum_{i',j'} w_{i',j'}^I},$$

respectively, to thereby normalize the weights $w_{r,i,j}^T$ and $w_{r,i,j}^I$;

(3.3.2) sampling feature vectors of $P_{rsm}\%$ dimensionality in positive data set $D_m^T$ by a random sampling method (RSM), where $P_{rsm}$ is an RSM sampling percentage;

(3.3.4) building an HMM $\lambda_m^r(T)$ via $$\hat{a}_{i,j} = \frac{\sum_{k=1}^{K} \frac{\omega_k}{P_k} \sum_{t=1}^{t_k-1} \alpha_t^k(i) a_{i,j} b_j(O_{t+1}^k) \beta_{t+1}^k(j)}{\sum_{k=1}^{K} \frac{\omega_k}{P_k} \sum_{t=1}^{t_k-1} \alpha_t^k(i) \beta_t^k(j)}$$

and

-continued $$\hat{b}_j(l) = \frac{\sum_{k=1}^{K} \frac{\omega_k}{P_k} \sum_{\substack{t=1 \\ s.t.O_t=v_l}}^{l_k-1} \alpha_t^k(i)\beta_t^k(j)}{\sum_{k=1}^{K} \frac{\omega_k}{P_k} \sum_{t=1}^{l_k-1} \alpha_t^k(i)\beta_t^k(j)}$$

where: $l_k$ is the length of $O_k$; $\alpha_t^k(i)$ is a forward variable for $O_k$; $\beta_t^k(j)$ is a backward variable for $O_k$; $\omega_k$ is a normalized weight for $O_k$; $\alpha_{i,j}$ is the (i, j)th element of a state transition matrix of the HMM; $b_j(l)$ is the (j,l)th element of a symbol emission matrix of the HMM; and $P_k = P(O_k | \lambda_m^r(T))$;

(3.3.4) calling WeakLearner learning with respect to $$h(O_s) = \begin{cases} +1, & \text{if } LLR(O_s) \text{ or } NLL(O_s) \geq \tau \\ -1, & \text{otherwise} \end{cases}$$

where LLR denotes a log likelihood ratio and NLL denotes a normalized log likelihood;

(3.3.5) training a threshold $\tau_m$ to minimize $\epsilon^r$ given by $$\epsilon^r = \Sigma_{i,j} w_{i,j}^T e_{r,i,j}^T + \Sigma_{i,j} w_{i,j}^I e_{r,i,j}^I,$$

where: $e_{r,i,j}^T = 1$ if $h_m^r(X_i^T, X_j^T, \lambda_m^r(T)) \geq \tau_m$ and $e_{r,i,j}^T = 0$ otherwise; and $e_{r,i,j}^I = 1$ if $h_m^r(X_i^T, X_j^T, \lambda_m^r(T)) < \tau_m$ and $e_{r,i,j}^I = 0$ otherwise;

(3.3.6) setting $$\alpha_m^r = \frac{1}{2} \log\left[\frac{1-\epsilon^r}{\epsilon^r}\right];$$

(3.3.7) updating the weights by $$w_{r+1,i,j}^T = w_{r,i,j}^T \cdot \exp(2\alpha_m^r e_{r,i,j}^T)$$

and $$w_{r+1,i,j}^I = w_{r,i,j}^I \cdot \exp(2\alpha_m^r e_{r,i,j}^I); \text{ and}$$

(3.3.8) setting r=r+1;

(3.4) obtaining a similarity score between $X_p^T$ and $X_q$, where $X_p^T$ is from the data set of the speaker:

$$\hat{h}_m(X_p^T, X_q) = \sum_{w=1}^{r} \alpha_m^w h_m^w(X_p^T, X_q, \lambda_m^w(T)).$$

2. The system of claim 1, wherein the one or more passwords are synchronously embedded into the lip motions, such that the verification of the speaker's identity by the underlying dynamic characteristics of the lip motions and the matching of the one or more passwords embedded in the lip motion is performed simultaneously.

3. The system according to claim 2;
wherein the modality of lip motions is completely insensitive to background noise;
wherein acquisition of lip motions of the speaker is insusceptible to distance between the speaker's lips and an acquisition means of the system;
wherein the system is usable by a mute person; and
wherein the system can operate in silence and in an obscure manner.

4. The system according to claim 2, wherein the system is included in one or more security systems.

5. The system according to claim 2, wherein the system is implemented across one or more computing hardware platform in one or more locations.

6. The system according to claim 2, wherein the process of verification of identity of the speaker is implemented in software that is executable on one or more hardware platform.

7. The system according to claim 1;
wherein the modality of lip motions is completely insensitive to background noise;
wherein acquisition of lip motions of the speaker is insusceptible to distance between the speaker's lips and an acquisition means of the system;
wherein the system is usable by a mute person; and
wherein the system can operate in silence and in an obscure manner.

8. The system according to claim 1, wherein the system is included in one or more security systems.

9. The system according to claim 1, wherein the system is implemented across one or more computing hardware platform in one or more locations.

10. The system according to claim 1, wherein the process of verification of identity of the speaker is implemented in software that is executable on one or more hardware platform.

11. The system according to claim 1, wherein the process further comprises the steps of:
(4) given a test lip-password sequence $V = \{v_1, v_2, \ldots, v_p\}$, verifying each subunit via $$\hat{h}_{min}^m = \min_{X_i^T \in D_m^T} \hat{h}_m(X_i^T, v_m)$$

after the step (3) is performed; and
(5) outputting: a result that the sequence V is uttered by the speaker if $\hat{h}_{min}^m \leq \tau$ for m=1, ..., p; or otherwise another result that the sequence V is not uttered by the speaker.

* * * * *